(12) United States Patent
Burout et al.

(10) Patent No.: US 10,510,273 B2
(45) Date of Patent: Dec. 17, 2019

(54) PLASTIC FASTENER AND PLASTIC FASTENER ASSEMBLY

(71) Applicant: Avery Dennison Corporation, Glendale, CA (US)

(72) Inventors: Charles J Burout, Bedford, NH (US); David L Schuttler, Townsend, MA (US); David S Smith, Fitchburg, MA (US)

(73) Assignee: Avery Dennison Corporation, Glendale, CA (US)

( * ) Notice: Subject to any disclaimer, the term of this patent is extended or adjusted under 35 U.S.C. 154(b) by 79 days.

(21) Appl. No.: 14/730,403

(22) Filed: Jun. 4, 2015

(65) Prior Publication Data
US 2016/0358518 A1 Dec. 8, 2016

(51) Int. Cl.
*G09F 3/08* (2006.01)
*F16B 2/26* (2006.01)

(52) U.S. Cl.
CPC . *G09F 3/08* (2013.01); *F16B 2/26* (2013.01)

(58) Field of Classification Search
CPC ..... G09F 3/14; G09F 3/08; G09F 3/12; B65C 7/005; B65C 7/003; F16B 2/26
See application file for complete search history.

(56) References Cited

U.S. PATENT DOCUMENTS

| 3,733,657 A | 5/1973 | Iankton |
| 4,288,017 A | 9/1981 | Russell |
| 4,417,656 A | 11/1983 | Kato |
| 4,456,123 A * | 6/1984 | Russell ................ A41H 37/008 206/343 |
| 4,462,784 A | 7/1984 | Russell |

(Continued)

FOREIGN PATENT DOCUMENTS

| EP | 1186550 | 3/2002 | |
| EP | 1186550 A2 * | 3/2002 | ............ B65C 7/005 |

(Continued)

OTHER PUBLICATIONS

International Search Report (dated Sep. 16, 2016) and Written Opinion issued in corresponding International Application No. PCTUS2016035618.

(Continued)

*Primary Examiner* — Cassandra Davis

(57) ABSTRACT

Plastic fastener and plastic fastener assembly. The plastic fastener assembly may be a length of continuously connected fastener stock and may include a first flexible filament having a first end and a second end, a first cross-bar disposed at the first end of the first flexible filament, and a first paddle disposed at the second end of the first flexible filament. The plastic fastener assembly may further include a second flexible filament, the second flexible filament having a first end and a second end, a second cross-bar disposed at the first end of the second flexible filament, and a second paddle disposed at the second end of the second flexible filament. The plastic fastener assembly may further include a first severable connector interconnecting the first and second paddles. The first severable connector may include a pair of generally frusto-semi-circular members joined to one another at a generally planar break region.

10 Claims, 8 Drawing Sheets

(56) References Cited

U.S. PATENT DOCUMENTS

| | | | | |
|---|---|---|---|---|
| 4,955,475 | A | * | 9/1990 | McCarthy ............... B65C 7/005 |
| | | | | 206/343 |
| 5,320,269 | A | | 6/1994 | Deschenes et al. |
| 5,463,799 | A | * | 11/1995 | Graham .................. B65C 7/003 |
| | | | | 24/704.1 |
| 6,173,836 | B1 | * | 1/2001 | Cooper ..................... G09F 3/14 |
| | | | | 206/346 |
| 6,220,434 | B1 | * | 4/2001 | Kubota .............. B65D 63/1081 |
| | | | | 140/93.2 |
| 7,021,462 | B2 | * | 4/2006 | Powers .................. F16B 43/00 |
| | | | | 206/338 |
| 9,199,756 | B2 | * | 12/2015 | Cooper ..................... G09F 3/14 |
| 2004/0205940 | A1 | * | 10/2004 | Cooper ..................... G09F 3/14 |
| | | | | 24/16 PB |
| 2014/0165363 | A1 | | 6/2014 | Cooper |

FOREIGN PATENT DOCUMENTS

| | | |
|---|---|---|
| EP | 2786364 | 10/2014 |
| GB | 2053256 | 2/1981 |
| WO | 87/04554 | 7/1987 |
| WO | 2004094236 | 11/2004 |

OTHER PUBLICATIONS

International Preliminary Report on Patentability issued in corresponding IA No. PCT/US2016/035618 dated Dec. 14, 2017.
"0.75" Natural Fine Fabric Paddle Fastener." Avery Dennison 08938 Fastener, 2017, www.andfel.com/tag-attaching-08938.html.

* cited by examiner

PLASTIC FASTENER AND PLASTIC FASTENER ASSEMBLY

FIELD OF THE INVENTION

The present invention relates generally to plastic fasteners of the type typically used in the packaging and/or sale of articles of commerce and relates more particularly to a novel such plastic fastener and to a fastener assembly including the same.

BACKGROUND OF THE INVENTION

Plastic fasteners of the type used, for example, to attach merchandise tags to articles of commerce or to secure articles of commerce to packaging are well-known and widely used in the retail industry. One common such fastener is a unitary plastic member comprising a flexible filament, a cross-bar (also commonly referred to as a "T-bar") at a first end of the flexible filament, and a paddle or other enlargement at a second end of the flexible filament. When used, for example, to secure a merchandise tag to an article of commerce, the cross-bar may be inserted through the merchandise tag and then through the article of commerce, with the paddle or other enlargement not being inserted through the merchandise tag or article of commerce and being appropriately sized and shaped to keep the tag from being pulled off the second end of the flexible filament. In an analogous fashion, when used, for example, to secure an article of commerce to packaging material, the cross-bar may be inserted through the packaging material, with the paddle or other enlargement not being inserted through the packaging material.

Plastic fasteners of the type described above are typically mass-produced in either one of two different forms known as fastener stock. A first type of fastener stock is a clip-type assembly, said assembly comprising a plurality of fasteners, each such fastener comprising a flexible filament having a cross-bar at one end thereof and a paddle or other enlargement at the opposite end thereof. The fasteners are arranged in a stacked orientation, with the respective cross-bars parallel to one another and the respective paddles parallel to one another, each of the cross-bars being joined to a common, orthogonally-disposed runner bar by a severable connector. Adjacent paddles also may be interconnected by severable connectors extending between the front face of one paddle and the rear face of its adjacent paddle.

The aforementioned fastener assembly is typically made through the process of injection molding. Several commercial embodiments of the above-described fastener assembly have been sold by the present assignee, Avery Dennison Corporation, as AVERY DENNISON® SWIFTACH® fastener clips.

A second type of fastener stock is shown in U.S. Pat. No. 4,955,475, which issued on Sep. 11, 1990, in the names of Francis T. McCarthy et al., and in U.S. Patent Application Publication No. US 2004/0205940 A1, which was published on Oct. 21, 2004, in the names of William J. Cooper et al., the disclosures of which are incorporated by reference. This type of fastener stock comprises a plurality of fasteners arranged in a side-by-side, co-planar assembly, the paddles and T-bars of successive fasteners being joined together by severable connectors so as to form a supply of continuously connected fastener stock. Several commercial embodiments of the above-described fastener assembly have been sold by the present assignee, Avery Dennison Corporation, as AVERY DENNISON® SYSTEM 1000® fastener assemblies.

The aforementioned second type of fastener stock is commonly manufactured using a process commonly referred to in the art as continuous molding. An example of an apparatus designed to manufacture continuously connected fastener stock using a continuous molding process is disclosed in U.S. Pat. No. 4,462,784, inventor David B. Russell, issued Jul. 31, 1984, which patent is incorporated herein by reference. In the aforementioned patent, continuously connected fastener stock is produced using a rotating mold wheel that includes cavities in its periphery that correspond in shape to the molded fastener stock. To form the fastener stock, molten plastic is extruded into the cavities of the rotating mold wheel with a layer of controlled film overlying the peripheral impression. The molten plastic is then allowed to solidify. A knife in substantially elliptical contact with the peripheral impression is then used to skive excess plastic from the rotating mold wheel (i.e., the layer of controlled film), leaving plastic only in the molding cavities. After the skiving process, the continuously connected fastener stock is removed, in-line, from the cavities in the molding wheel. Transfer rolls advance the fastener stock typically to a stretching station where selected portions of the fastener stock are selectively distended (e.g., using divergent sprocket wheels). After the stretching process, the fastener stock is collected onto a windup roll for packaging.

As noted above, in the case of continuously connected fastener stock, the paddles of adjacent fasteners are typically joined together in a side-by-side arrangement by severable connectors. Such severable connectors are typically filamentous members typically having a square or rectangular transverse cross-section. As individual fasteners are dispensed from the continuously connected fastener stock, the severable connector that extends between the trailing end of the paddle of the dispensed fastener and the leading end of the successive paddle elongates and breaks, leaving a small remnant of the connector on one or both of the dispensed paddle and the successive paddle. As can be appreciated, such a remnant is undesirable as it may snag and damage the article of commerce to which the fastener is attached. The risk of significant damage caused by the remnant may be particularly great where the fastener is attached to fine articles of clothing.

SUMMARY OF THE INVENTION

It is an object of the present invention to provide a novel plastic fastener.

It is another object of the present invention to provide a plastic fastener as described above that overcomes at least some of the shortcomings associated with existing plastic fasteners.

It is yet another object of the present invention to provide a plastic fastener as described above that has a minimal number of parts, that is easy to use, and that is inexpensive to manufacture.

Therefore, according to one aspect of the present invention, there is provided a plastic fastener, the plastic fastener comprising (a) a flexible filament, the flexible filament having a first end and a second end; (b) a cross-bar, the cross-bar being disposed at the first end of the flexible filament; (c) a paddle, the paddle being disposed at the second end of the flexible filament; and (d) a first connector remnant, the first connector remnant being disposed on the paddle and being shaped to include a generally frusto-semi-circular member.

In another, more detailed feature of the invention, the paddle may be shaped to include a front surface, a rear surface, a top surface, a bottom surface, a left surface, and a right surface, and the first connector remnant may be disposed on one of the left surface and the right surface.

In another, more detailed feature of the invention, the generally frusto-semi-circular member may include a front surface and a rear surface, and the front surface may slope towards the rear surface as the first connector remnant extends away from the paddle.

In another, more detailed feature of the invention, the plastic fastener may further comprise a second connector remnant, the second connector remnant may be disposed on the paddle, and the second connector remnant may be shaped to include a generally frusto-semi-circular member.

In another, more detailed feature of the invention, the paddle may be shaped to include a front surface, a rear surface, a top surface, a bottom surface, a left surface, and a right surface, the first connector remnant may be disposed on one of the left surface and the right surface, and the second connector remnant may be disposed on the other of the left surface and the right surface.

In another, more detailed feature of the invention, each of the flexible filament, the cross-bar, the paddle, and the first connector remnant may have a rear surface, and the rear surfaces of the flexible filament, the cross-bar, the paddle and the first connector remnant may be coplanar.

It is another object of the present invention to provide a novel plastic fastener assembly.

According to one aspect of the invention, there is provided a plastic fastener assembly, the plastic fastener assembly comprising (a) a first flexible filament, the first flexible filament having a first end and a second end; (b) a first cross-bar, the first cross-bar being disposed at the first end of the first flexible filament; (c) a first paddle, the first paddle being disposed at the second end of the first flexible filament; (d) a second flexible filament, the second flexible filament having a first end and a second end; (e) a second cross-bar, the second cross-bar being disposed at the first end of the second flexible filament; (f) a second paddle, the second paddle being disposed at the second end of the second flexible filament; and (g) a first severable connector, the first severable connector extending between and interconnecting the first paddle and the second paddle, wherein the first severable connector has a reduced cross-sectional area at an approximate midpoint between the first paddle and the second paddle.

In another, more detailed feature of the invention, the first severable connector may comprise a first generally frusto-semi-circular member and a second generally frusto-semi-circular member, and the first and second generally frusto-semi-circular members may be joined to one another at a generally planar break region.

In another, more detailed feature of the invention, each of the first paddle and the second paddle may be shaped to include a front surface, a rear surface, a top surface, a bottom surface, a left surface, and a right surface, and the first severable connector may extend between and interconnect the right surface of the first paddle and the left surface of the second paddle.

In another, more detailed feature of the invention, the first and second generally frusto-semi-circular members may be mirror-images of one another.

In another, more detailed feature of the invention, at least one of the first and second generally frusto-semi-circular members may include a front surface and a rear surface, and the front surface may slope towards the rear surface as the generally frusto-semi-circular member extends away from its respective paddle.

In another, more detailed feature of the invention, the plastic fastener assembly may further comprise a second severable connector, and the second severable connector may extend between and interconnect the first cross-bar and the second cross-bar.

In another, more detailed feature of the invention, the plastic fastener assembly may be a length of continuously connected fastener stock.

According to another aspect of the invention, there is provided a plastic fastener assembly, the plastic fastener assembly comprising (a) a first continuous side member; (b) a second continuous side member; and (c) a plurality of cross members interconnecting the first and second continuous side members, each of the cross members comprising (i) a flexible filament, the flexible filament having a first end and a second end, the first end of the flexible filament joined to the second continuous side member; (ii) a paddle disposed at the second end of the flexible filament, the paddle comprising a left surface and a right surface; (iii) a first connector portion, the first connector portion disposed on the left surface of the paddle; and (iv) a second connector portion, the second connector portion disposed on the right surface of the paddle; (v) wherein the first connector portion of one cross member is joined to the second connector portion of another cross member at a break region of reduced cross-section.

In another, more detailed feature of the invention, the first connector portion and the second connector portion may be mirror-images of one another.

In another, more detailed feature of the invention, each of the first connector portion and the second connector portion may comprise a generally frusto-semi-circular member.

In another, more detailed feature of the invention, the generally frusto-semi-circular member may include a front surface and a rear surface, and the front surface may slope towards the rear surface as the generally frusto-semi-circular member extends away from its respective paddle.

In another, more detailed feature of the invention, the plastic fastener assembly may be a length of continuously connected fastener stock.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION OF THE INVENTION

Figure 1:
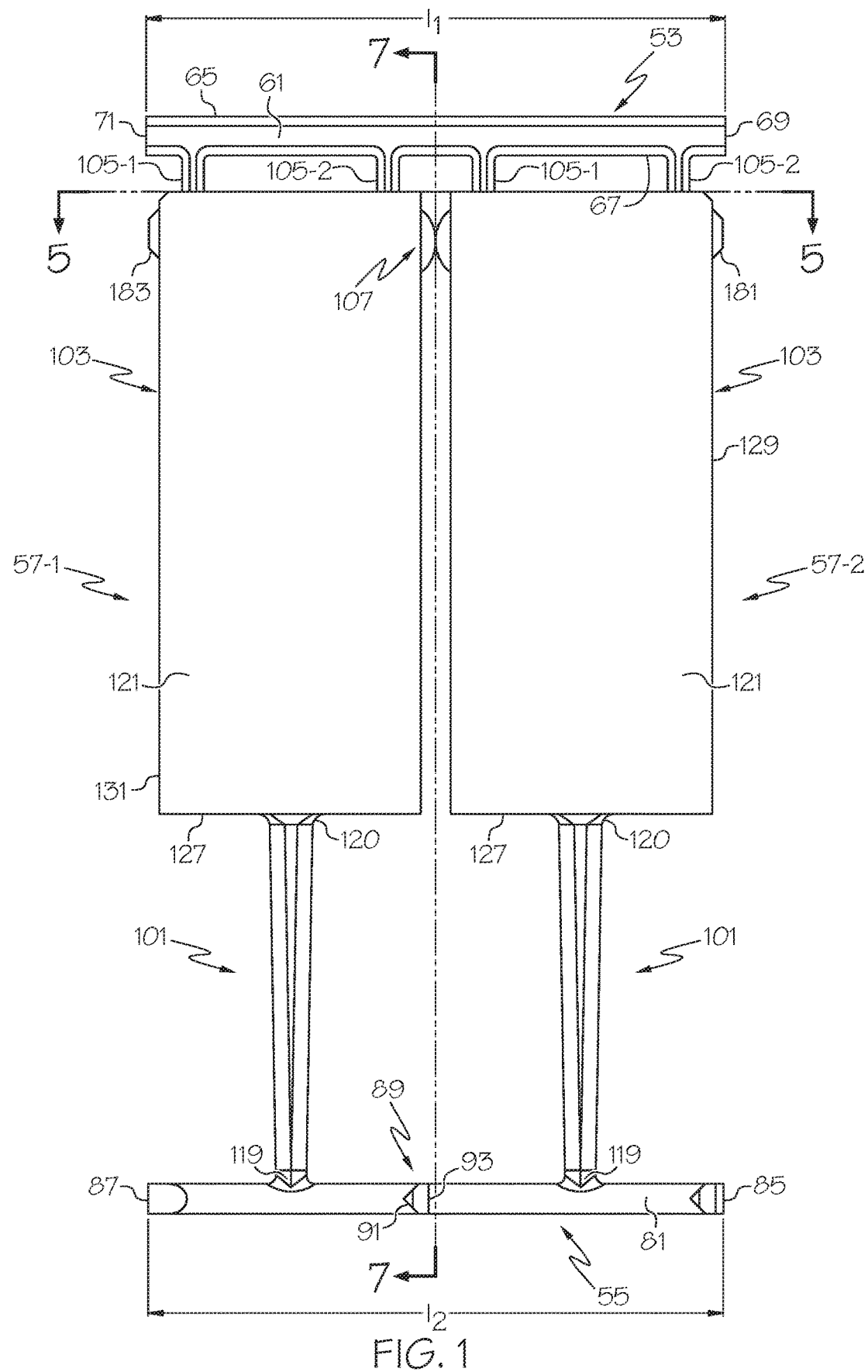
FIG. 1 is a front view of an embodiment of a plastic fastener assembly constructed according to the teachings of the present invention.

The present invention is directed, at least in part, to the discovery of a novel severable connector of the type used to connect adjacent paddles of a plastic fastener assembly. In particular, the severable connector of the present invention may be designed to include a predefined break region of reduced cross-section. The severable connector of the present invention may additionally include notch sensitivity features that act as stress risers to weaken the severable connector and to facilitate breakage at the break region. In this manner, the severable connector may break more cleanly (i.e., with a minimized remnant) and/or with a lower required application force than is the case with existing severable connectors.

More specifically, according to one embodiment, the severable connector of the present invention may be shaped to include a plurality of portions (i.e., two or more portions) extending from adjacent paddles and interconnected in some fashion at one or more intersecting areas of reduced cross-section, thereby forming a predefined break region. In addition, the severable connector may further be shaped to include notch sensitivity features that act as stress risers to weaken the severable connector at the beginning, end, and along the length of the intersection path. As an example of the foregoing, the severable connector may be shaped to include a pair of generally semi-circular members, one of the generally semi-circular members extending from one of a pair of neighboring paddles, the other of the generally semi-circular members extending, in a mirror-image fashion, from the other of the pair of neighboring paddles. Each of the generally semi-circular members has a flattened portion that is distal to its respective paddle, the flattened portions of the generally semi-circular members in contact with and joined to one another to form a break region.

Referring now to FIGS. 1 through 8, there are shown various view of an exemplary embodiment of a plastic fastener assembly constructed according to the teachings of the present invention, the plastic fastener assembly being identified generally by reference numeral 51.

Plastic fastener assembly 51, which may be made of a suitable polymeric material, such as, but not limited to, a thermoplastic polyurethane, may be a unitary (i.e., one-piece) structure and may be made by a continuous molding process of the type described in U.S. Pat. No. 4,462,784. In other words, plastic fastener assembly 51 may be a length of continuously connected fastener stock.

Plastic fastener assembly 51 may be shaped to comprise a first continuous side member 53, a second continuous side member 55, and a plurality of cross members 57-1 and 57-2. (It should be noted that, although the number of cross members 57 included in plastic fastener assembly 51 is two, this number is merely exemplary as there may be three or more (perhaps even tens or hundreds or more) cross members 57 included in plastic fastener assembly 51 or there may be as few as one cross member 57 included in plastic fastener assembly 51.) First continuous side member 53 and second continuous side member 55 may be arranged generally parallel to one another. Cross members 57-1 and 57-2, which may extend between and interconnect first continuous side member 53 and second continuous side member 55, may be arranged generally parallel relative to one another and generally perpendicularly relative to first continuous side member 53 and second continuous side member 55.

First continuous side member 53, which may be a solid structure and which may have a generally rectangular transverse cross-section, may be shaped to include a front surface 61, a rear surface 63, a top surface 65, a bottom surface 67, a right side surface 69, and a left side surface 71. As can be appreciated, because first continuous side member 53 may be made by a continuous molding process, the length $l_1$ of first continuous side member 53, wherein length $l_1$ may be defined as the distance between right side surface 69 and left side surface 71, may be varied and may extend for a considerable distance. The other dimensions of first continuous side member 53 may be varied to suit a particular application or need.

Second continuous side member 55, which may be a solid structure and which may have a generally D-shaped transverse cross-section, may be shaped to include an arcuate front surface 81, a flat rear surface 83, a right side surface 85, and a left side surface 87. As can be appreciated, because second continuous side member 55 may be made by a continuous molding process, the length $l_2$ of second continuous side member 55, where length $l_2$ may be defined as the distance between right side surface 85 and left side surface 87, may be varied and may extend for a considerable distance. (The length $l_1$ of first continuous side member 53 and the length $l_2$ of second continuous side member 55 may be substantially the same, but they need not be.) The other dimensions of second continuous side member 55 may be varied to suit a particular application or need.

Second continuous side member 55 may also be shaped to include a notch 89 that may extend from arcuate front surface 81 towards flat rear surface 83. Notch 89 may be appropriately positioned along the length $l_2$ of second continuous side member 55 and may be used to facilitate the severing of second continuous side member 55 at a desired location to define individual fastener cross-bars. Notch 89 may be generally V-shaped and may have asymmetrical leading and trailing edges. For example, without wishing to be limited to any particular shape, notch 89 may have a leading edge 91 that may be offset from normal to length $l_2$ by a comparatively smaller angle and a trailing edge 93 that may be offset from normal to length $l_2$ by a comparatively greater angle.

Cross members 57-1 and 57-2, which may be identical to one another, may be shaped so that each may include a flexible filament 101, a paddle 103, a pair of connectors 105-1 and 105-2, and a connector 107. Filament 101, which may be an elongated solid structure of generally rectangular transverse cross-section, may be shaped to include a first end 119 and a second end 120. First end 119 of filament 101 may be joined to second continuous side member 55 and second end 120 of filament 101 may be joined to paddle 103. Filament 101 may taper in width along its length and may have a comparatively greater width proximate to paddle 103 and a comparatively lesser width proximate to second continuous side member 55.

Paddle 103, which may be an elongated solid structure having a length that may run generally parallel to filament 101 and generally perpendicularly relative to first continuous side member 53 and second continuous side member 55, may be a generally rectangular prismatic member shaped to include a front surface 121, a rear surface 123, a top surface 125, a bottom surface 127, a right side surface 129, and a left side surface 131. Filament 101 may be joined to bottom surface 127 of paddle 103, connectors 105-1 and 105-2 may be joined to top surface 125 of paddle 103, and connector 107 may be joined at one end to the right side surface 129 of a paddle 103 and to the left side surface 131 of an adjacent paddle 103.

Connectors 105-1 and 105-2, which may be identical to one another, may each be an elongated solid structure of generally rectangular cross-section extending generally parallel relative to paddle 103 and generally perpendicularly relative to first continuous side member 53. Connectors 105-1 and 105-2 may extend between and be joined to bottom surface 67 of first continuous side member 53 and top surface 125 of paddle 103, with connectors 105-1 and 105-2 being spaced apart along the length of top surface 125 of paddle 103. Connectors 105-1 and 105-2 may be suitably constructed to be severed, preferably each at a location near paddle 103. Such severing of connectors 105-1 and 105-2 may take place during the dispensing of individual fasteners from plastic fastener assembly 51. Alternatively, if desired, connectors 105-1 and 105-2 may be severed (and first continuous side member 53 may be removed from plastic fastener assembly 51) prior to the loading of the plastic fastener assembly into a fastener dispensing tool. It should be noted that, although, in the present embodiment, the number of connectors 105 interconnecting each paddle 103 to first continuous side member 53 is two, this number is merely exemplary as there may be three or more such connectors 105 interconnecting each paddle 103 to first continuous side member 53 or there may be as few as one such connector 105 interconnecting each paddle 103 to first continuous side member 53.

Second connector 107, which may be a solid structure, may comprise a first portion 181, a second portion 183, a third portion 184, and a fourth portion 185. First portion 181 and second portion 183 may be mirror-images of one another, and third portion 184 and fourth portion 185 may be mirror-images of one another.

First portion 181, which may extend away from right side surface 129 of paddle 103 of cross-member 57-1, may be a generally semi-circular member shaped to include a front surface 186, a rear surface 187, an upper side surface 188, and a lower side surface 189. The width of first portion 181, which may be defined by the distance between front surface 186 and rear surface 187, may decrease as first portion 181 extends away from paddle 103 of cross-member 57-1. More specifically, front surface 186 may slope towards rear surface 187 as first portion 181 extends away from paddle 103 of cross-member 57-1. Upper side surface 188 and lower side surface 189, which may be spaced apart from one another by an intersecting region between first portion 181 and second portion 183, may be arcuately-shaped surfaces and may endow first portion 181 with its generally semi-circular shape.

In a corresponding fashion, second portion 183, which may extend away from left side surface 131 of paddle 103 of cross-member 57-2, may be a generally semi-circular member shaped to include a front surface 195, a rear surface 197, an upper side surface 198, and a lower side surface 199. The width of second portion 183, which may be defined by the distance between front surface 195 and rear surface 197, may decrease as second portion 183 extends away from paddle 103 of cross-member 57-2. More specifically, front surface 195 may slope towards rear surface 197 as second portion 183 extends away from paddle 103 of cross-member 57-2. Upper side surface 198 and lower side surface 199, which may be spaced apart from one another by an intersecting region between first portion 181 and second portion 183, may be arcuately-shaped surfaces and may endow second portion 183 with its generally semi-circular shape.

Third portion 184 of second connector 107 may be an elongated member extending between and interconnecting upper side surface 188 of first portion 181 and upper side surface 198 of second portion 183. Third portion 184 may be shaped to include a front surface 211, a rear surface 213, and a top surface 215. Front surface 211 may be spaced rearwardly relative to each of front surface 186 of first portion 181 and front surface 195 of second portion 183. Rear surface 213 may be flush with each of rear surface 187 of first portion 181 and rear surface 197 of second portion 183. Top surface 215 may be spaced a short distance above the region of intersection between first portion 181 and second portion 183.

In a fashion analogous to that described above for third portion 184, fourth portion 185 of second connector 107 may be an elongated member extending between and interconnecting lower side surface 189 of first portion 181 and lower side surface 199 of second portion 183. Fourth portion 185 may be shaped to include a front surface 216, a rear surface 217, and a bottom surface 218. Front surface 216 may be spaced rearwardly relative to each of front surface 186 of first portion 181 and front surface 195 of second portion 183. Rear surface 217 may be flush with each of rear surface 187 of first portion 181 and rear surface 197 of second portion 183. Bottom surface 218 may be spaced a short distance below the region of intersection between first portion 181 and second portion 183.

Third portion 184 and fourth portion 185 may serve to strengthen the connection between first portion 181 and second portion 183. During the continuous molding process, third portion 184 and fourth portion 185 are an end result of adding an in-mold cavity relief feature, protecting thin steel areas within the mold cavities that form notches 231 and 233.

As noted above, first portion 181 and second portion 183 may come together at an intersecting region 221. When viewed from the front of connector 107 (as in, for example, FIG. 2), intersecting region 221 may appear as a flattened area between the arcuate surfaces of first portion 181 and second portion 183. Intersecting region 221, which may serve as a break region between first portion 181 and second portion 183, may be an area of reduced transverse cross-section along second connector 107. Because of the generally planar shape and reduced cross-sectional area of intersecting region 221, the breaking of second connector 107 at intersecting region 221 may involve less elongation of second connector 107, thereby resulting in a cleaner break with a minimal remnant left behind.

Figure 2:
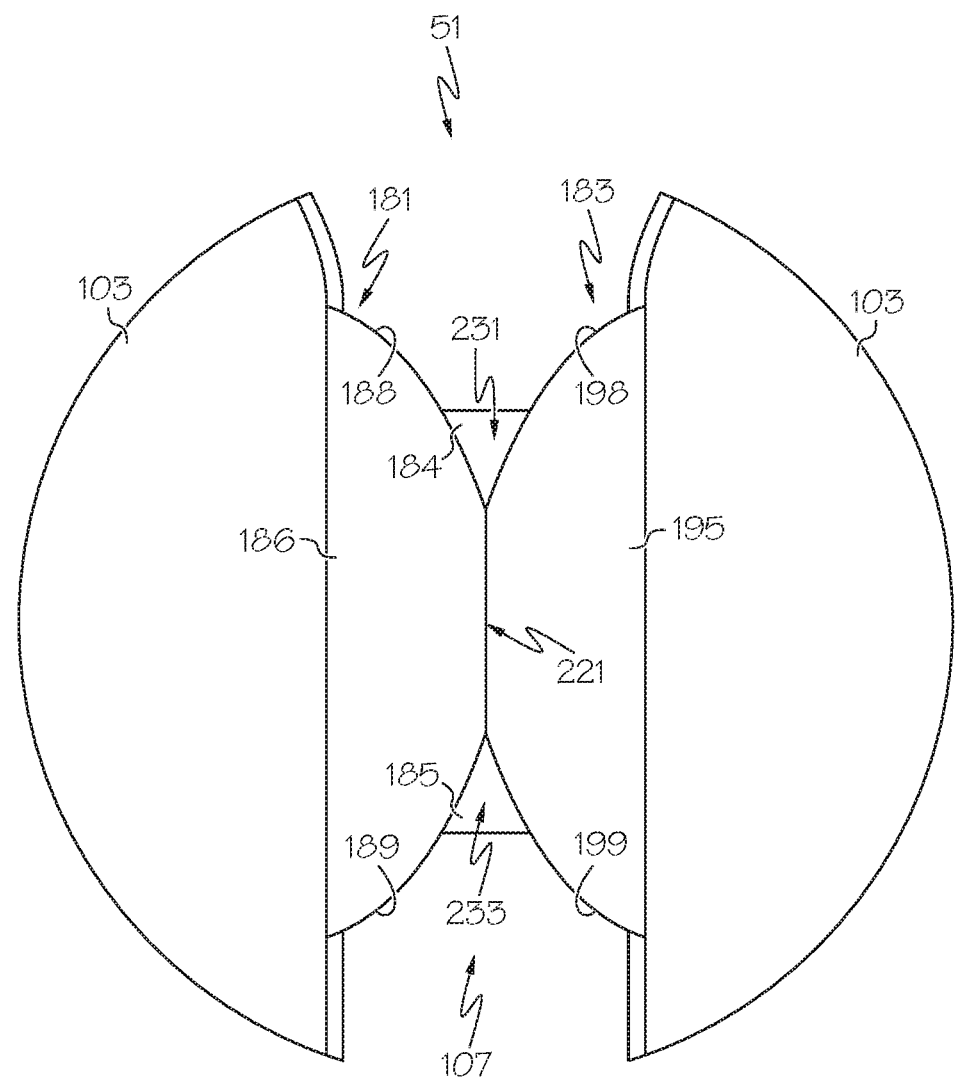
FIG. 2 is an enlarged fragmentary front view of the plastic fastener assembly shown in FIG. 1.
Figure 3:
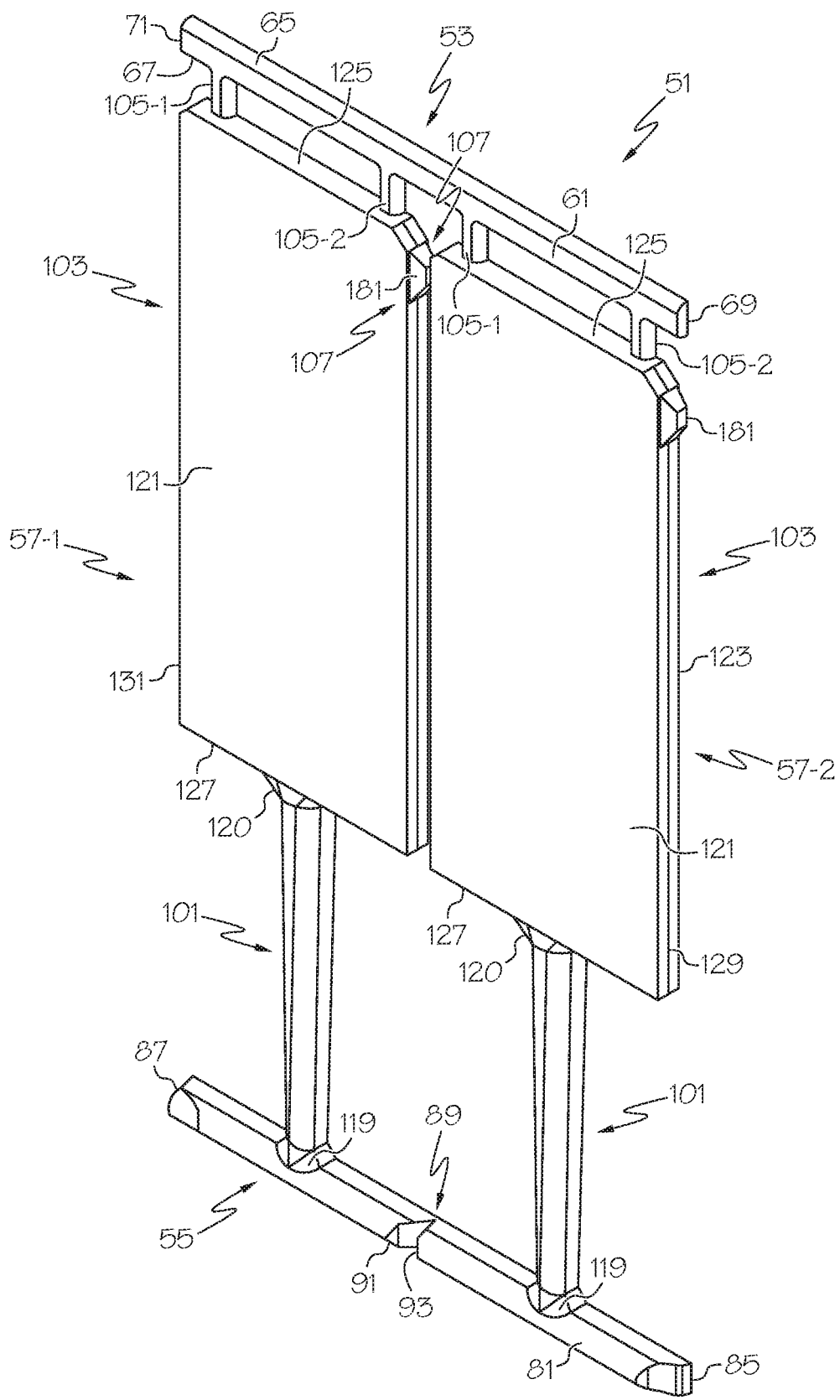
FIG. 3 is a perspective view of the plastic fastener assembly shown in FIG. 1.
Figure 4:
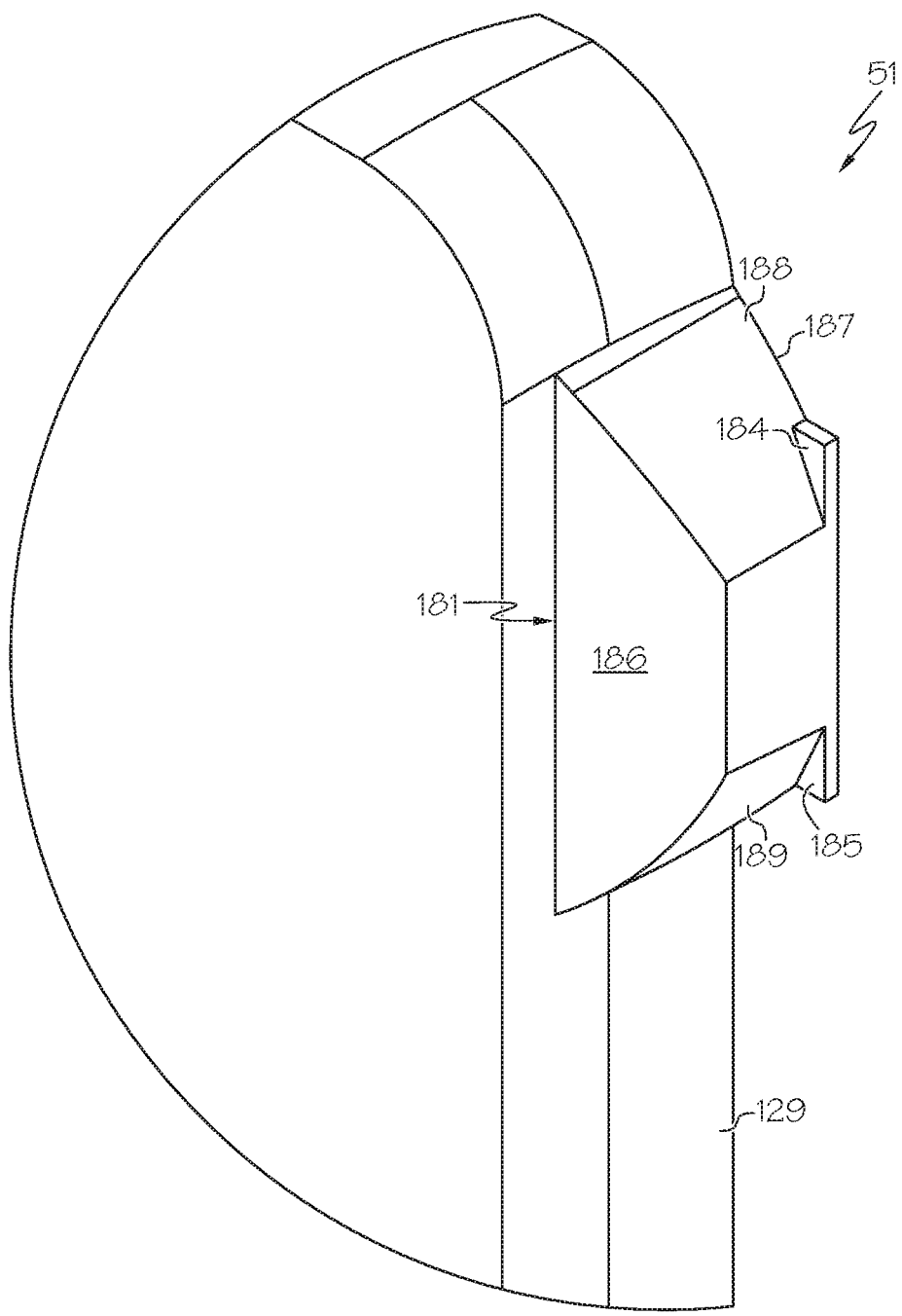
FIG. 4 is an enlarged fragmentary perspective view of the plastic fastener assembly shown in FIG. 1.
Figure 5:
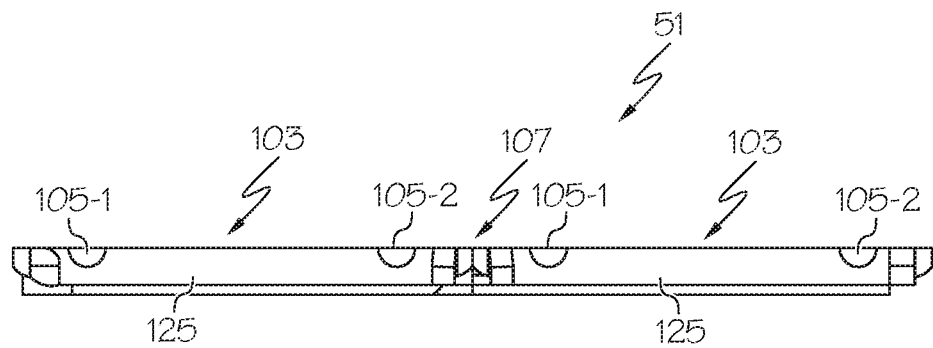
FIG. 5 is a section view taken along line 5-5 in FIG. 1.
Figure 6:
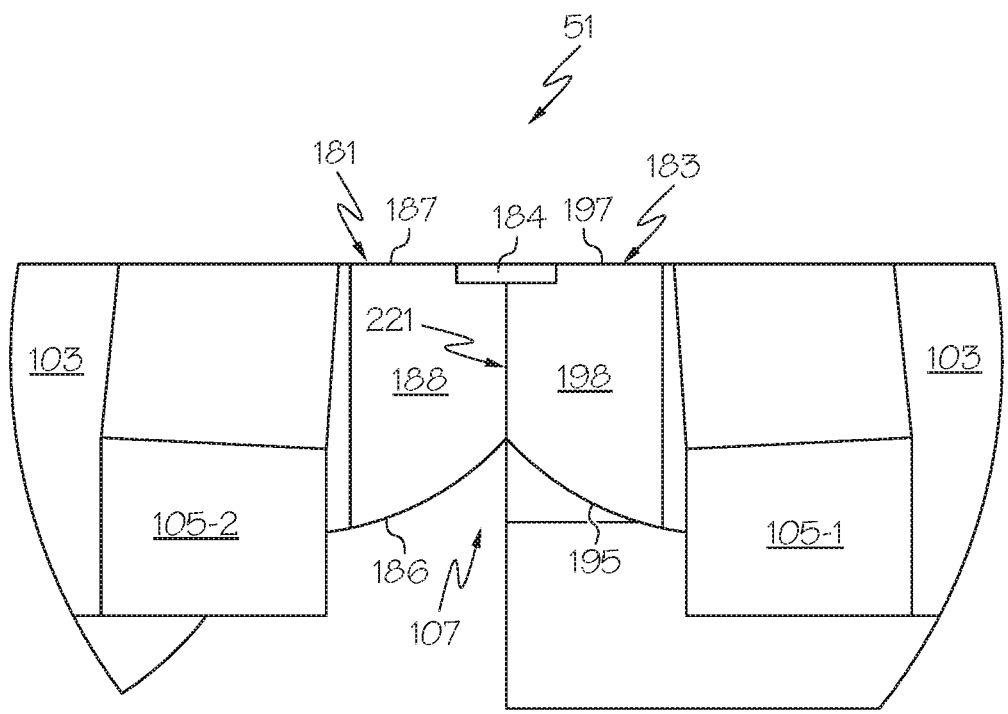
FIG. 6 is an enlarged fragmentary view of the plastic fastener assembly shown in FIG. 5.
Figure 7:
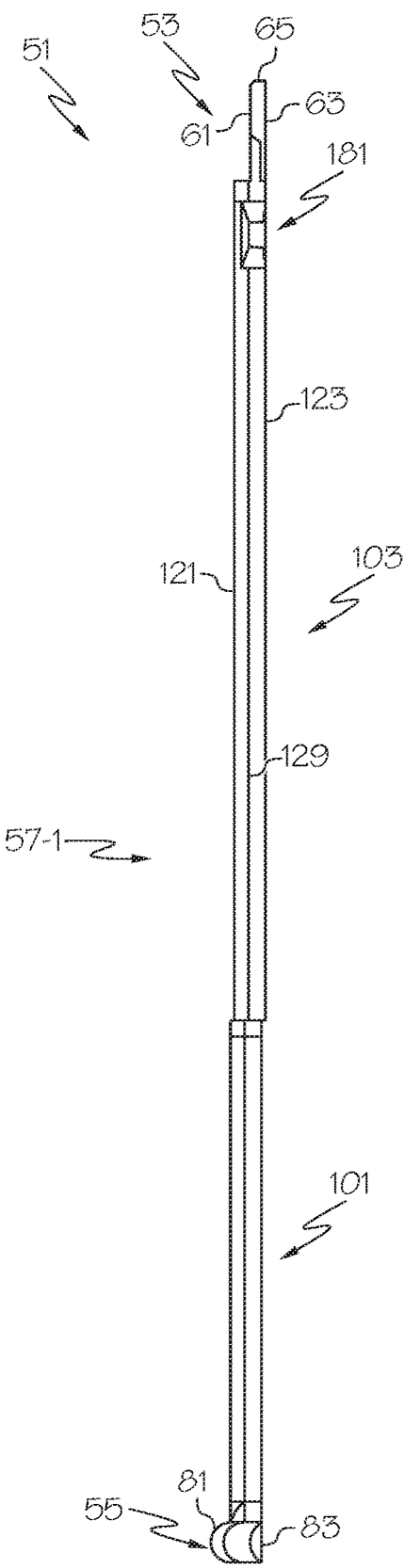
FIG. 7 is a section view taken along line 7-7 in FIG. 1.
Figure 8:
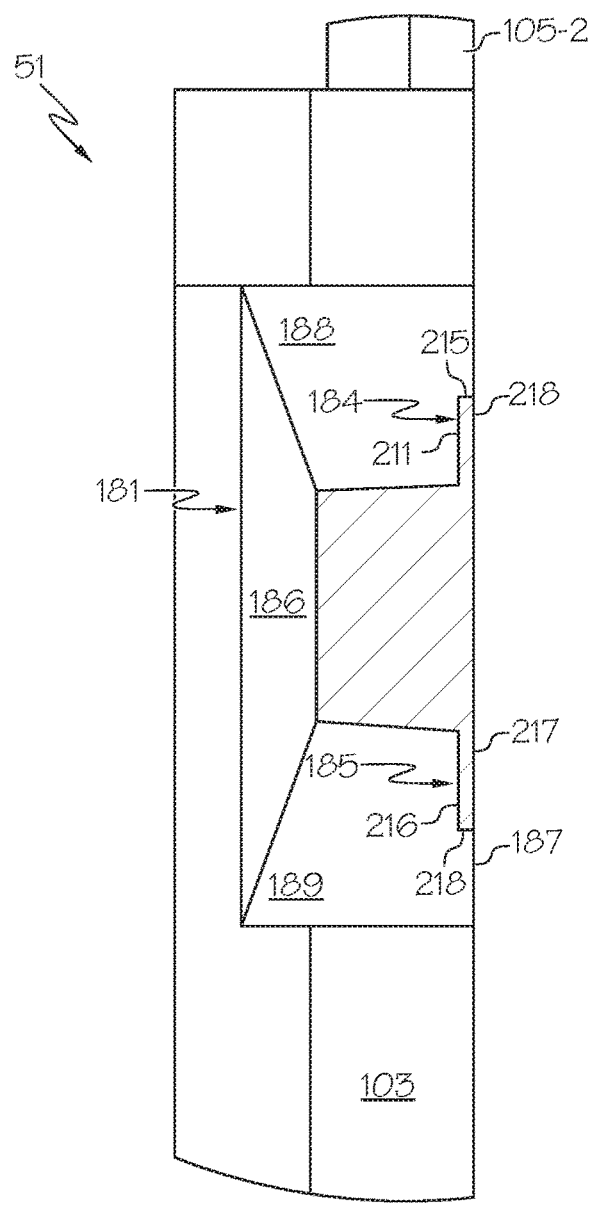
FIG. 8 is an enlarged fragmentary view of the plastic fastener assembly shown in FIG. 7.

In addition, as seen best in FIG. 2, upper side surface 188 of first portion 181 and upper side surface 198 of second portion 183 may jointly define a notch 231. Moreover, lower side surface 189 of first portion 181 and lower side surface 199 of second portion 183 may jointly define a notch 233. Notches 231 and 233 may be appropriately shaped to promote breakage of second connector 107 at intersecting region 221.

As can be appreciated, because of the continuous molding process that may be used to form plastic fastener assembly 11, the respective rear surfaces of first continuous side member 53, second continuous side member 55, filaments 101, paddles 103, connectors 105-1 and 105-2, and connectors 107 may be coplanar.

Individual plastic fasteners may be dispensed from plastic fastener assembly 51 and may be used, for example, to attach merchandise tags to articles of commerce and/or to secure articles of commerce to packaging material. Such a dispensing of individual plastic fasteners from plastic fastener assembly 51 may be effected using a suitable fastener dispensing tool, which tool may be similar to a conventional "tagger gun" of the type disclosed in the following patents, which are incorporated herein by reference: U.S. Pat. No. 4,955,475, inventors Francis T. McCarthy et al., issued Sep. 11, 1990; and U.S. Pat. No. 4,288,017, inventor Russell, issued Sep. 8, 1981.

Figure 9A:
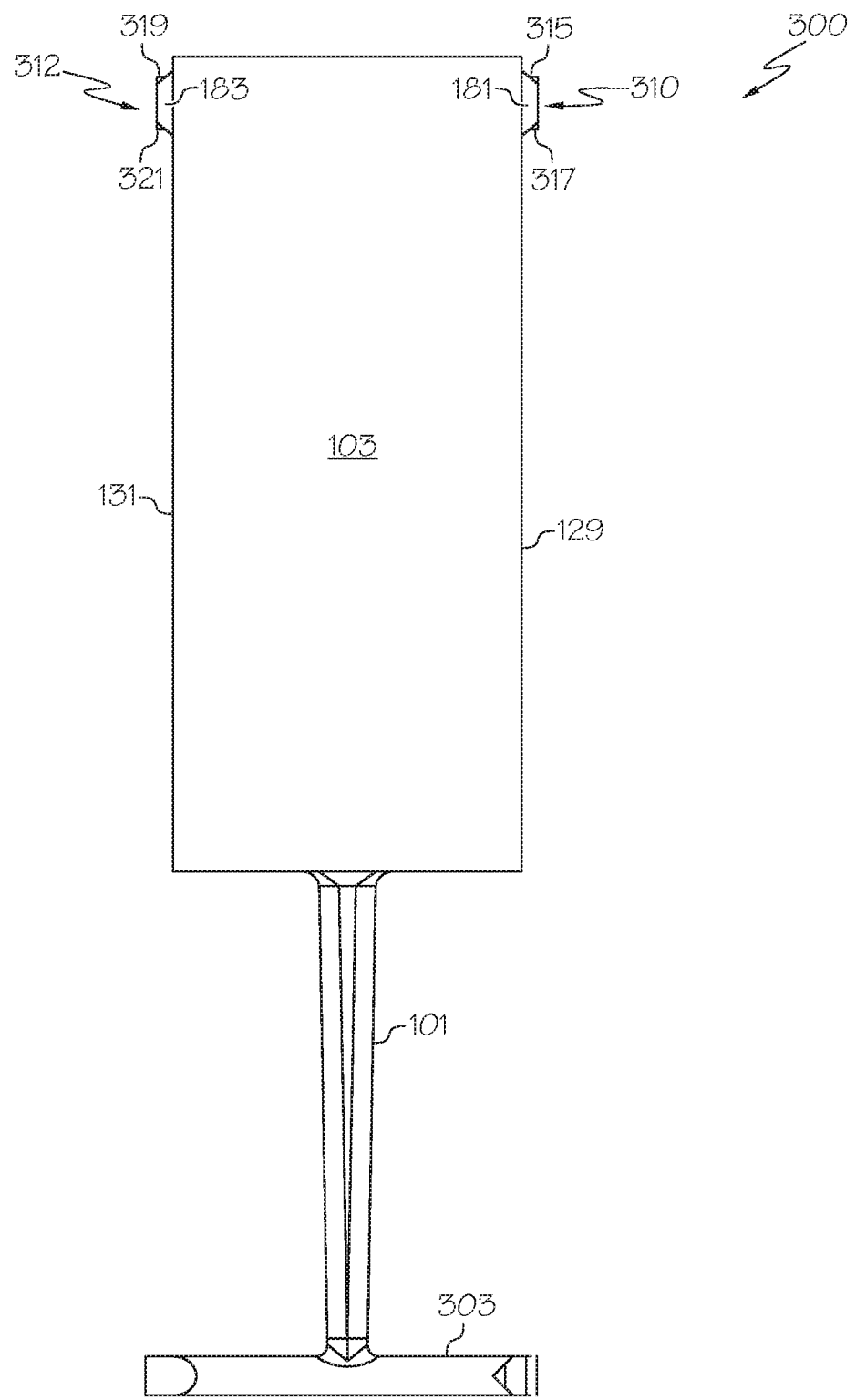
FIGS. 9(a) and 9(b) are front and enlarged fragmentary perspective views, respectively, of an individual plastic fastener obtained from the plastic fastener assembly of FIG. 1.
Figure 9B:
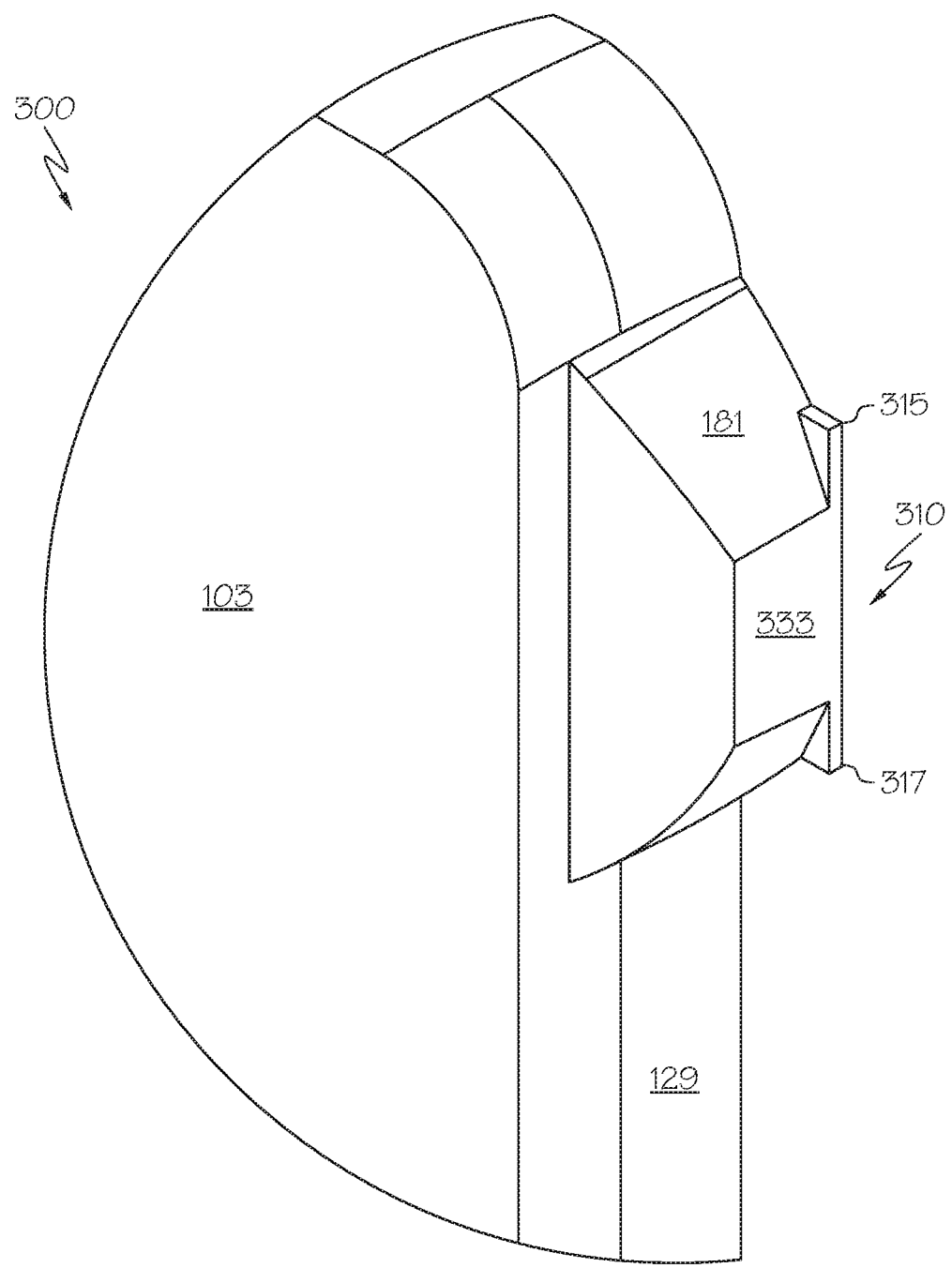

Referring now to FIGS. 9(a) and 9(b), there are shown different views of an individual plastic fastener that has been dispensed from plastic fastener assembly 51 using a tagger gun or otherwise, the individual plastic fastener being represented generally by reference numeral 300. Fastener 300 may include a filament 101 having a cross-bar 303 at one end thereof and a paddle 103 at the opposite end thereof. As can be seen, the separation of fastener 300 from an adjacent fastener may result in a first remnant 310 being left on a right side surface 129 of paddle 103 and a second remnant 312 being left on a left side surface 131 of paddle 103. Remnant 310, which may be formed by severing a connector 107 at its intersecting region 221, may be made up essentially of a first portion 181 of the connector 107, a left half 315 of a third portion 184 of the connector 107, and a left half 317 of a fourth portion 185 of the connector 107. By comparison, remnant 312, which may be formed by severing another connector 107 at its intersecting region 221, may be made up essentially of a second portion 183 of the connector 107, a right half 319 of a third portion 184 of the connector 107, and a right half 321 of a fourth portion 185 of the connector 107. Each of remnants 310 and 312 may be generally frusto-semi-circular in shape, i.e., a truncated semi-circle or a semi-circle having a planar or beveled area interrupting its curvature and distal to paddle 103. More specifically, each of remnants 310 and 312 has a substantially planar face 333 (see FIG. 9(b)) of reduced cross-section at the distal end of a generally semi-circular remnant. Such a planar face of reduced cross-section may be less likely to snag an article than may be the case with conventional remnants.

The embodiments shown above are intended to be merely exemplary and those skilled in the art shall be able to make numerous variations and modifications to them without departing from the spirit of the present invention. All such variations and modifications are intended to be within the scope of the present invention as defined in the appended claims.

What is claimed is:

1. A plastic fastener assembly comprising:
   (a) a first flexible filament, the first flexible filament having a first end and a second end;
   (b) a first cross-bar, the first cross-bar being disposed at the first end of the first flexible filament;
   (c) a first paddle, the first paddle being disposed at the second end of the first flexible filament;
   (d) a second flexible filament, the second flexible filament having a first end and a second end;
   (e) a second cross-bar, the second cross-bar being disposed at the first end of the second flexible filament;
   (f) a second paddle, the second paddle being disposed at the second end of the second flexible filament; and
   (g) a first severable connector which is shaped to include notch sensitivity features, the first severable connector extending between and interconnecting the first paddle and the second paddle, wherein the first severable connector has a reduced cross-sectional area at an approximate midpoint between the first paddle and the second paddle;
   wherein the first severable connector comprises a first frusto-semi-circular member and a second frusto-semi-circular member, the first and second frusto-semi-circular members being joined to one another at a generally planar break region.

2. The plastic fastener assembly as claimed in claim 1 wherein each of the first paddle and the second paddle is shaped to include a front surface, a rear surface, a top surface, a bottom surface, a left surface, and a right surface and wherein the first severable connector extends between and interconnects the right surface of the first paddle and the left surface of the second paddle.

3. The plastic fastener assembly as claimed in claim 1 wherein the first and second frusto-semi-circular members are mirror-images of one another.

4. The plastic fastener assembly as claimed in claim 1 wherein at least one of the first and second frusto-semi-circular members includes a front surface and a rear surface and wherein the front surface slopes towards the rear surface as the frusto-semi-circular member extends away from its respective paddle.

5. The plastic fastener assembly as claimed in claim 1 further comprising a second severable connector, the second severable connector extending between and interconnecting the first cross-bar and the second cross-bar.

6. The plastic fastener assembly as claimed in claim 1 wherein the plastic fastener assembly is a length of continuously connected fastener stock.

7. A plastic fastener assembly comprising:
   (a) a first continuous side member;
   (b) a second continuous side member; and
   (c) a plurality of cross members interconnecting the first and second continuous side members, each of the cross members comprising
      (i) a flexible filament, the flexible filament having a first end and a second end, the first end of the flexible filament joined to the second continuous side member;
      (ii) a paddle disposed at the second end of the flexible filament, the paddle comprising a left surface and a right surface;
      (iii) a first connector portion, the first connector portion disposed on the left surface of the paddle; and
      (iv) a second connector portion, the second connector portion disposed on the right surface of the paddle;
      (v) wherein the first connector portion of one cross member is joined to the second connector portion of another cross member at a break region of reduced cross-section and a flattened area with a planar shape;

wherein each of the first connector portion and the second connector portion comprises a frusto-semi-circular member.

8. The plastic fastener assembly as claimed in claim 7 wherein the first connector portion and the second connector portion are mirror-images of one another.

9. The plastic fastener assembly as claimed in claim 7 wherein the frusto-semi-circular member includes a front surface and a rear surface and wherein the front surface slopes towards the rear surface as the frusto-semi-circular member extends away from its respective paddle.

10. The plastic fastener assembly as claimed in claim 7 wherein the plastic fastener assembly is a length of continuously connected fastener stock.

\* \* \* \* \*